United States Patent [19]
Rogge et al.

[11] Patent Number: 5,474,416
[45] Date of Patent: Dec. 12, 1995

[54] FLAT LOAD TRAILER

[76] Inventors: Michael E. Rogge; Jacqulion R. Rogge, both of 941 Lazelle, Sturgis, S. Dak. 57785

[21] Appl. No.: 154,717

[22] Filed: Feb. 24, 1994

[51] Int. Cl.⁶ .................................................. B60P 1/44
[52] U.S. Cl. ........................... 419/482; 414/481; 414/495
[58] Field of Search ........................... 414/474, 475, 414/476, 480, 481, 482, 483, 484, 485, 495, 537, 469, 461, 460, 459; 280/414.1, 43.17, 43; 254/3 R

[56] References Cited

U.S. PATENT DOCUMENTS

| | | |
|---|---|---|
| 2,230,014 | 1/1941 | Raven . |
| 2,856,091 | 10/1958 | Johnson .................................. 414/483 |
| 3,860,255 | 1/1975 | Rodriguez ............................. 280/43.19 |
| 4,077,643 | 3/1978 | Bates ................................. 280/43.19 X |
| 4,637,770 | 1/1987 | Swadell .................................... 414/495 |
| 4,659,100 | 4/1987 | Welker ................................ 414/483 X |
| 4,685,855 | 8/1987 | Celli ........................................ 414/482 |
| 5,308,213 | 5/1994 | Gilbertson ............................... 414/482 |

*Primary Examiner*—Michael S. Huppert
*Assistant Examiner*—Stephen Gordon
*Attorney, Agent, or Firm*—Bradley P. Sylvester

[57] ABSTRACT

This invention relates to a towable trailer, having an inner and outer frame, that function as levers, to lower the load bed horizontally to ground level. The levers are pivotally attached at the rear of the trailer. The trailer has a hinged tongue portion that when raised, allows cargo such as snowmobiles, to be driven or unloaded off of the front of the load bed while the load bed remains on ground level.

2 Claims, 2 Drawing Sheets

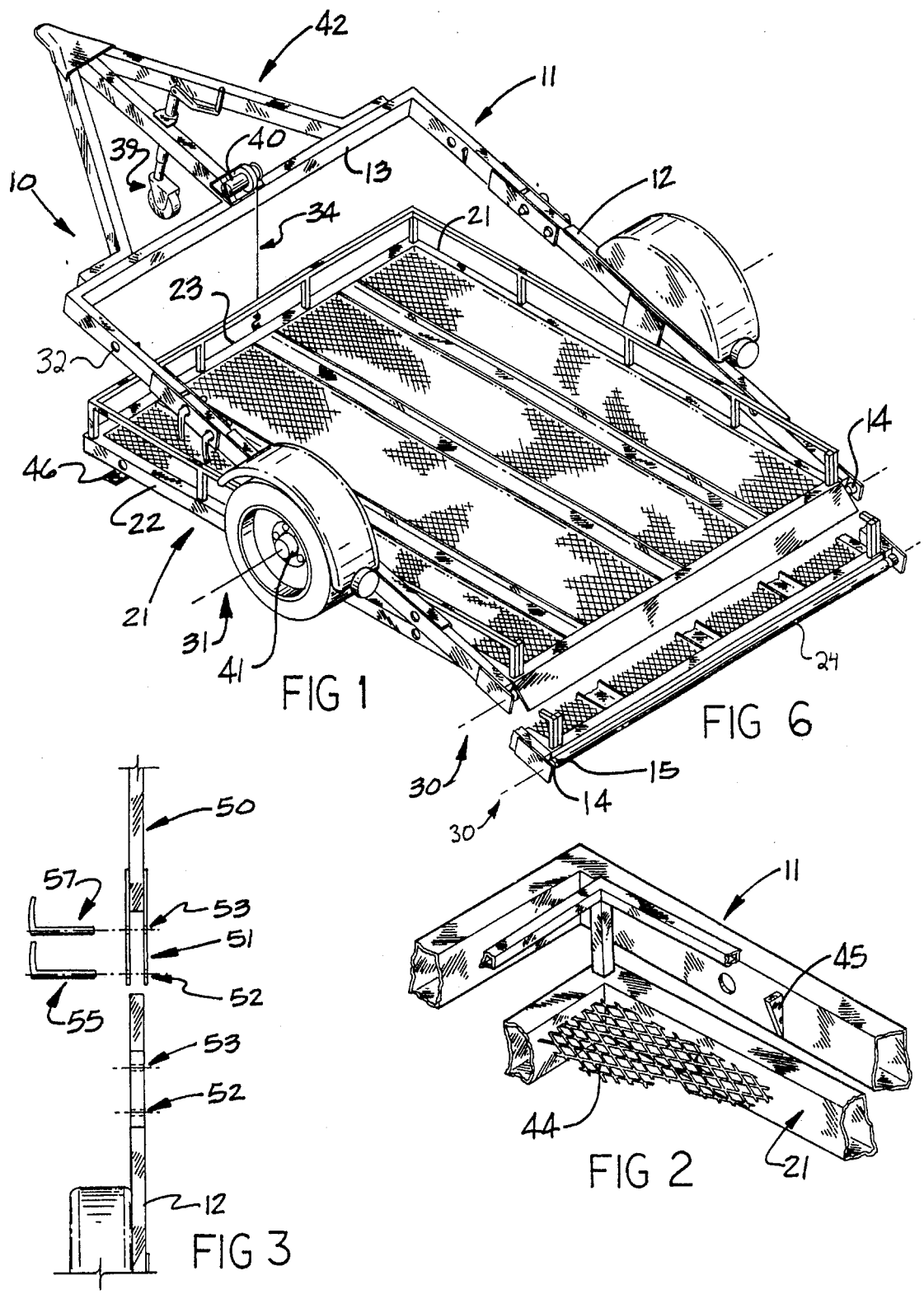

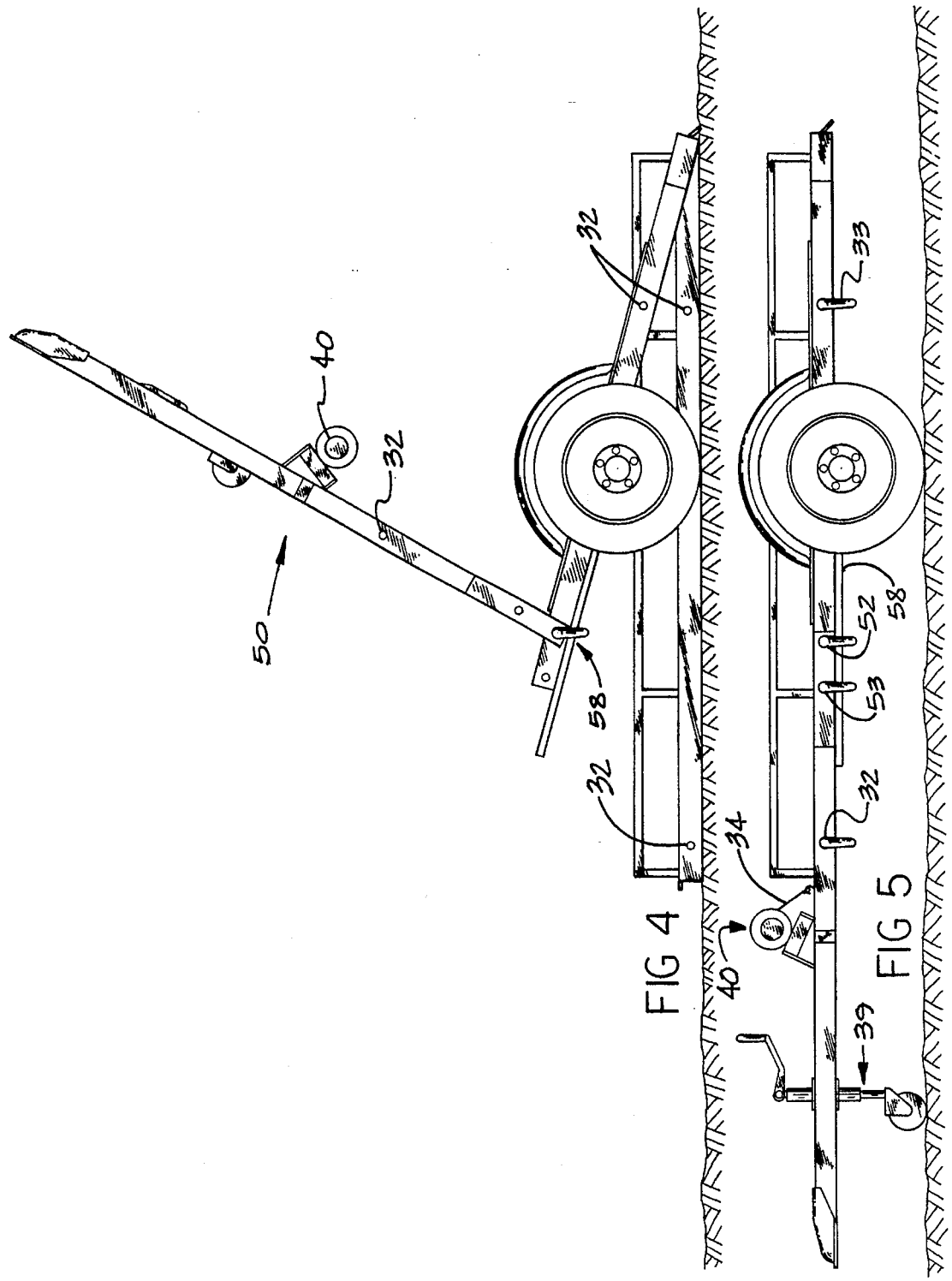

5,474,416

FLAT LOAD TRAILER

BACKGROUND OF THE INVENTION

Prior trailers, as typified in U.S. Pat. No. 2,466,102, attempted to lower the trailer bed to ground level, but were only able to accomplish this through an elaborate wheel suspension system. Through the use of winches and pulleys, the entire trailer structure was lowered to ground level, rather than just the bed itself.

Use of a pivoting lever frame, as illustrated in U.S. Pat. No. 3,860,255, allowed the rear of the trailer to lower, but resulted in the front portion of the outside frame to rise to an undesired height, since the pivot point was situated directly behind the wheel axles, and forward of the end of the trailer. To give the necessary weight to the rear portion of the trailer, the load bed extended some distance beyond the frame, or substantial mass had to be added to the rear portion.

A subsequent trailer, as illustrated in U.S. Pat. No. 4,077,643, had a front tongue frame that was hinged to the front end of a trailer bed, with the trailer bed lowering toward the ground through the use of small pivot arms attached to the trailer bed, rotating about a drop style wheel axle. The small pivot arms failed to provide a substantial amount of leverage, and there was rotation of the wheels during loading and unloading.

A motorcycle trailer, as illustrated in U.S. Pat. No. 4,659,100, employed a see-saw bar as a lever to raise and lower the rear portion of the trailer. The front portion of the trailer did not lower, and the trailer functioned merely as an inclined ramp during the loading process.

SUMMARY OF THE INVENTION

It is the object of the present invention to provide a new and improved trailer, which allows the load carrying bed to be lowered horizontally to ground level, and raised back to the original position in a horizontal manner, with no movement of the trailer wheels during the lowering or raising of the load bed with a hinged front tongue frame, or hinged forward end portion, that may be raised to allow cargo such as snowmobiles, or other items that do not have a reverse drive gear, to be unloaded off of the front of the trailer load bed.

BRIEF DESCRIPTION OF DRAWINGS

FIG. 1 is a perspective view of the trailer in a loading position from the upper rear of the trailer.

FIG. 2 is an enlarged perspective showing side guide means positioned between the trailer frames.

FIG. 3 is an exploded top view of the tongue hinge.

FIG. 4 is a side view of the trailer in a loading position, with the load bed lowered to ground level, and the hinged tongue portion raised for loading or unloading purposes.

FIG. 5 is a side view of the trailer in a transport position.

FIG. 6 is a perspective view of the rear of the trailer showing the pivot point components.

DETAILED DESCRIPTION OF THE PREFERRED EXEMPLARY EMBODIMENT OF THE PRESENT INVENTION

In reference to the drawings in which like reference numerals designate like or corresponding pans throughout the various views, and with particular reference to FIG. 1, 2, 3, 4, 5 and 6, the trailer is designated generally as 10.

The trailer comprises a U-shaped outer frame 11, having two parallel or nearly parallel outer side rails 12, opened in the rear and joined by a front rail 13. Outer frame sleeves 14, comprising hollow tubes, are fixed to the rear ends of the outer side rails 12, and are positioned so as to receive the ends of a shaft 15, positioned between the rear ends of the outer side rails 12, having each of its ends fitted inside the outer frame sleeves 14. The shaft 15, has a diameter slightly less than the inside diameter of the sleeves 14, allowing the shaft 15, to rotate within the outer frame sleeves 14.

Wheel axle spindles 41, are joined to the outer side rails 12, preferably near the midpoint of the length of the outer side rail 12. Trailers that are desired to carry heavier loads, or trailers that exceed eight (8) feet may have tandem wheel axle spindles 41.

The trailer has a rectangular inner frame 21, positioned inside the outer frame 11, having two or more parallel inner side members 22, with the front ends of the inner side members 22 fixed to an inner front member 23, and the rear ends of the inner side members 22, fixed to an inner frame sleeve 24, to form a rigid structure defining a trailer bed 44. The inner frame sleeve 24, comprises a hollow tube having a length slightly less than the distance between the outer frame sleeves 14, and an interval diameter greater than the diameter of the shaft 15.

The shaft 15, is positioned within the inner frame sleeve 24, so that the ends of the shaft 15 protrude out from both ends of the inner sleeve 24. The shaft 15 ends are positioned within each of the outer frame sleeves 14. The shaft 15, the outer frame sleeve 14, and the inner frame sleeve 24, all move independently of each other.

The outer frame 11, supports the inner frame 21, both of which function as levers. The frames 11 and 12, pivot around a pivot point 30, at the extreme rear of the trailer, with the fulcrum point 31, located at the side mounted wheel axle spindles 41. The wheel axle spindles 41 may be fixed near the midpoint of the side length of the trailer body, which allows for greater stability and a minimal angled difference between the inner frame 21 and outer frame 11, during the raising and lowering of the trailer bed.

When the trailer bed 44, is raised or lowered, it is necessary for the distributed mass behind the wheel axle spindles 41 to create an angular force which equals or exceeds the angular force produced from the mass distribution in front of the wheel axle spindles 41. The trailer's inner frame 21 can acquire the appropriate angular force in the rear of the trailer 10, through the addition of additional mass in the form of an added weight, or a heavier frame construction, so that the distribution of the mass behind the wheel axle spindles 41, equals or exceeds the angular force exerted in front of the wheel axle spindles 41.

The outer frame 11, and inner frame 21, are fixed in a horizontal position, and remain parallel to each other during transport through the use of locking pins 33, which are positioned in locking pin holes 32, on the sides of the parallel outer side rails 12 and inner side members. Locking pins 33 may be used at a variety of locations along the length of the trailer 10, to reduce any sagging of the inner frame 21 when heavy loads are transported.

A tongue frame 42, is fixed to the front end of the outer frame 11, with a hitch 43 at the front of the tongue frame 42. A jack 39, or similar support leg, is fixed on the tongue frame 42, supplying a forward means of outer frame 11 support in conjunction with the wheel axle spindles.

A winch 40, is fixed on the tongue frame, and has a cable 34 attached to the inner front member 23.

When the locking pins 33, are removed, and the tension in the cable 34, is relaxed, the angular force produced by the rear portion of the trailer causes the area of the trailer defining the pivot point 30, to descend. At the same time, the inside front rail 23, also descends so that the entire inner frame 21, defining the trailer bed 44, remains horizontal as it lowers. As the trailer bed 44, lowers, the front portion of the outer frame 11, rises in an angular fashion, pivoting around pivot point 30. The inner frame 21, will continue to lower until it is completely flat on a ground level. During this process, there is no rotation of the wheel axle spindles 41, since the trailer 10 remains stationary during the entire process.

To raise the trailer bed 44, a winch 40, takes up the cable 34, so as to urge the front of the outer frame 11 and the inner frame 21 toward each other. To provide for maximum effectiveness of the winch 40, it is positioned on the tongue frame 42, and is offset at an angle ranging from 15 to 40 degrees in relation to the tongue frame 42.

The front of the inner frame 21, remains on the ground, until the outer frame 11, lowers to a level where it is supported through a jack 39, or similar fixed support. At this point in the loading process, the winch 40 continues to urge the front end of the inner frame and outer frame together, which causes the front of the inner frame 21, to rise up toward the front of the outer frame 11, until they are parallel.

As the frames approach each other and become nearly parallel, the inner frame 21, is directed to the proper position through side guides 45, which are positioned between the inner frame 21, and the outer frame 11. Preferably, the side guides 45 are fixed to the inner side of the outer frame 11. The side guides 45, are positioned so that they protrude inwardly toward the inner flame 21, and have an angled end that increasingly restricts the sideways movement of the load bed 44 as it raises.

The movement of the outer frame 11, and the inner frame 21, toward each other is halted at a desired point through bed stop tabs 46, that are fixed preferably to the inner frame 21, and protrude out so that they contact the outer frame 11, at the point where both flames 11 and 21 are parallel to each other. As the inner frame 21, approaches the outer frame 11, the bed stop tabs 46, contact the outer flame 11, and prevent further upward movement of the inner flame 21. Once the stop tabs 46 have engaged the outer flame 11, the (two) frames 11 and 21 are parallel to each other, and are in a position to receive the locking pins 33, which are placed in the locking pin holes.

This trailer has a hinged forward end portion 50, comprising the tongue frame 42, that can be raised to allow cargo to be unloaded from the front of the trailer 10, with the tongue frame 42 pivoting around pivot pins 58 located on the side rails 12. A portion of the trailer's front outer frame 11 can be part of the hinged forward end portion 50, to increase the length of the tongue frame 42, allowing the tongue frame to be raised higher, to allow the unloading of items with greater heights. Referring also to FIG. 3, side plates 51, having a hinge pivot pin hole 52, and hinge lock hole 53, are fixed to and protrude from the back ends of the hinged forward end portion 50. The side wall plates 51, are spaced apart so as to receive the front end of the outer side rail 12, having a pivot pin hole 52 and a lock pin hole 53.

The hinged forward end portion 50 is pivotally attached to the outside rail with a hinge pivot pin 55, which is placed through the corresponding hinge pivot pin holes 52. Hinge lock pins 57, are placed through the corresponding hinge lock pin holes 53, so as to fix the position of the hinged forward end portion 50 and the outside side rails 12, in relationship to each other. To raise the hinged forward end portion 50, the hinge lock pin 57, is removed from the hinge lock pin holes 53, and the forward end portion 50, is lifted up, pivoting around the hinge pivot pin 55, which remains in the pivot pin hole 52. Once the forward end portion 50, is raised, the objects may be removed off of the front end of the trailer 10, rather than off of the rear end. of the trailer.

When the hinged forward end portion 50, is lowered back into its original position, its downward movement is restricted by a bottom brace plate 58, which is fixed to the bottom side of the front of the outer outside rails 12. The hinge locking pins 57, are placed in their respective hinge locking pin holes 53, and the trailer is ready for transportational use.

The trailer described can be used to transport and unload off the front of the trailer a variety of items, ranging from relatively light loads to heavy loads.

When the hinged forward end portion 50 is used, the trailer 10 allows cargo to be unloaded with greater ease. A trailer having a hinged forward end portion 50, is most effective for small loads such as snowmobiles, go carts, or similar items that do not have a reverse gear, and are more easily unloaded by simply driving them forwards off the trailer.

While the invention has been described in connection with what is presently considered to be the most practical and preferred embodiment, it is understood that the invention is not to be limited to cover various modifications and equivalent arrangements included within the spirit and scope of the appended claims.

What is claimed is:

1. A trailer, comprising:

A. A U-shaped outer frame, having two parallel outer side rails, opened in the rear and joined by a front rail to form a rigid structure;

B. A rectangular inner frame, positioned inside the outer frame, having side members, a front member and a rear member formed in a rigid structure, with a shaft positioned in the rear member of the inner frame in which the shaft ends are situated within outer frame sleeves, that are fixed to ends of the outer frame side rails, and in which said shaft pivots to effect pivoting of the frames relative to each other;

C. A hinged forward end portion that pivots around and is attached to pivot pins located on the side rails, and includes means for allowing pivotal raising of the entire hinged forward end portion upwardly away from the inner and outer frames with the exception of the portion of the forward portion attached at the pivot pins to allow the unloading of cargo from the front of the trailer.

2. A trailer, as recited in claim 1, in which the hinged forward end portion comprises a tongue frame.

* * * * *